(12) United States Patent
Grayson et al.

(10) Patent No.: US 8,408,311 B2
(45) Date of Patent: Apr. 2, 2013

(54) TERMINATION ASSEMBLY FOR A STEEL TUBE UMBILICAL

(75) Inventors: Daniel Grayson, Hartlepool (GB); Christpher Jameson, Newcastle Upon Tyne (GB); Anthony Hanson, Tyne and Wear (GB)

(73) Assignee: Technip France SA (FR)

( * ) Notice: Subject to any disclaimer, the term of this patent is extended or adjusted under 35 U.S.C. 154(b) by 636 days.

(21) Appl. No.: 12/443,008

(22) PCT Filed: Sep. 20, 2007

(86) PCT No.: PCT/GB2007/003555
§ 371 (c)(1),
(2), (4) Date: Jan. 18, 2010

(87) PCT Pub. No.: WO2008/037962
PCT Pub. Date: Apr. 3, 2008

(65) Prior Publication Data
US 2010/0140930 A1    Jun. 10, 2010

(30) Foreign Application Priority Data

Sep. 29, 2006  (FR) .................................... 06 08557
Jul. 11, 2007   (GB) .................................... 0713416.6

(51) Int. Cl.
*E21B 17/00*     (2006.01)
(52) U.S. Cl. ........ 166/367; 166/334; 166/360; 166/380; 166/242.3
(58) Field of Classification Search ................... 166/367, 166/338, 344, 346, 351, 352, 360, 378–380, 166/242.1–242.3; 405/168.1, 169, 184.4; 285/114–116, 222.1, 335
See application file for complete search history.

(56) References Cited

U.S. PATENT DOCUMENTS

| | | | |
|---|---|---|---|
| 2,655,638 A * | 10/1953 | Allen | ............................ 439/271 |
| 3,747,632 A | 7/1973 | Kok et al. | |
| 4,397,357 A | 8/1983 | Hettinger | |
| 4,640,163 A * | 2/1987 | Douglas | .......................... 83/175 |
| 4,662,785 A | 5/1987 | Gibb et al. | |
| 4,708,525 A | 11/1987 | Beynet et al. | |
| 5,183,966 A * | 2/1993 | Hurtado et al. | .................. 174/20 |
| 5,362,258 A * | 11/1994 | Arnswald et al. | ............. 439/695 |

(Continued)

FOREIGN PATENT DOCUMENTS

| DE | 20 41 291 A1 | 3/1972 |
|---|---|---|
| DE | 33 46 451 A1 | 7/1985 |

(Continued)

OTHER PUBLICATIONS

International Search Report dated Dec. 28, 2007, issued in corresponding international application No. PCT/GB2007/003555.

(Continued)

*Primary Examiner* — Matthew Buck
(74) *Attorney, Agent, or Firm* — Ostrolenk Faber LLP

(57) ABSTRACT

A termination assembly for a steel tube umbilical, wherein a plurality of the elongated umbilical elements which compose the umbilical are steel tubes, said termination assembly comprising a cavity through which said tubes pass, said cavity being filled with a filler material, at least one of said tubes having at least one region of increased localized diameter at a location within said cavity to define at least one load bearing face on the tube to anchor said at least one tube within said cavity.

13 Claims, 3 Drawing Sheets

U.S. PATENT DOCUMENTS

| | | | |
|---|---|---|---|
| 6,102,077 A | 8/2000 | Legallais et al. | |
| 6,161,880 A * | 12/2000 | Peppel | 285/340 |
| 6,283,206 B1 * | 9/2001 | Fraser et al. | 166/242.3 |
| 6,412,825 B1 * | 7/2002 | Langkjaer | 285/222.2 |
| 6,472,614 B1 | 10/2002 | Dupont et al. | |
| 6,716,063 B1 * | 4/2004 | Bryant et al. | 439/589 |
| 6,880,640 B2 * | 4/2005 | Barratt et al. | 166/346 |
| 7,172,447 B2 * | 2/2007 | Allensworth et al. | 439/271 |
| 7,467,662 B2 * | 12/2008 | Smith | 166/343 |
| 7,866,398 B2 * | 1/2011 | Barratt et al. | 166/341 |
| 8,100,182 B2 * | 1/2012 | Smith et al. | 166/346 |
| 2006/0157235 A1 * | 7/2006 | Allensworth | 166/75.13 |

FOREIGN PATENT DOCUMENTS

| | | |
|---|---|---|
| GB | 2001034 | 1/1979 |
| GB | 2316990 | 3/1998 |
| JP | 09 072463 A | 3/1997 |
| WO | WO 93/17176 | 9/1993 |
| WO | WO 2005/124213 | 12/2005 |

OTHER PUBLICATIONS

Search Report under Section 17, dated Jan. 2, 2008, issued from the United Kingdom Intellectual Property Office in related British Application No. GB071829539.

* cited by examiner

TERMINATION ASSEMBLY FOR A STEEL TUBE UMBILICAL

CROSS REFERENCE TO RELATED APPLICATIONS

The present application is a 35 U.S.C. §371 National Phase conversion of PCT/GB2007/003555, filed Sep. 20, 2007, which claims benefit of French Application No. 0608557, filed Sep. 29, 2006, and British Application No. 0713416.6, filed Jul. 11, 2007, the disclosures of which are incorporated herein by reference. The PCT International Application was published in the English language.

BACKGROUND OF THE INVENTION

The present invention relates to a termination assembly for a steel tube umbilical and in particular to a termination assembly having improved means for anchoring steel tubes of the umbilical to a termination and to a method of forming a termination assembly.

An umbilical consists of a group of one or more types of elongate active umbilical elements, such as electrical cables, optical fibre cables and fluid conveying conduits, cabled together for flexibility and over-sheathed and/or armoured for mechanical strength. Umbilicals are typically used for transmitting power, signals and fluids (for example for fluid injection, hydraulic power, gas release, etc.) to and from a subsea installation. The main fluid conduits used for manufacturing umbilical are thermoplastic hoses and steel tubes. API (American Petroleum Institute) 17E "Specification for Subsea Umbilicals", third edition, July 2003, provides standards for the design and manufacture of such umbilicals.

A steel tube umbilical is defined as an umbilical wherein all or most of the elongated umbilical elements which compose the umbilical are steel tubes. The steel tubes and the other elongated umbilical elements that make up the umbilical are grouped together and wound in a helical pattern. Examples of steel tube umbilical are disclosed in the documents U.S. Pat. No. 6,472,614, WO93/17176 and GB2316990. Steel tubes are not permeable to gases. They are also able to resist installation and in-service axial loads, and high external collapse pressures, therefore the umbilical, with judicious design, is able to withstand axial loads without requiring the addition of tensile armour layers. It is also possible to increase further its axial resistance by adding internal steel or composite rods inside the bundle (for example see U.S. Pat. No. 6,472,614 and WO2005/124213).

U.S. Pat. No. 6,102,077 discloses an elongated subsea structure combining the functions of a flexible pipe and of an umbilical. This structure comprises a large diameter central flexible pipe used as a production line for conveying oil or gas, and a plurality of small diameter peripheral pipes arrayed in helical or S/Z manner around the central flexible pipe, said peripheral pipes being used as service or control lines for fluid injection, gas lift injection, hydraulic power or gas release. Such structures are known under the names ISU® "Integrated Subsea Umbilical" and IPB "Integrated Production Bundle". The central flexible pipe generally complies with the standard API 17J "Specification for Unbonded Flexible Pipe", second edition, November 1999. The small diameter peripheral pipes of ISU® and IPB are generally steel tubes.

SUMMARY OF THE INVENTION

The invention aims at solving the problem of anchoring of the steel tubes of a steel tube umbilical with the termination. The invention also applies to the anchoring of the peripheral steel tubes of ISU® and IPB structures with their termination or end fitting.

A known method of umbilical termination is illustrated in FIG. 1. The method comprises welding the steel tubes 2 forming part of the umbilical 1 to a steel bulkhead plate 3 through which the steel tubes 2 pass and which is mechanically attached to the termination 4. The interior cavity of the termination 4 is filled with a compression resistant resin 5, gravity poured, through a filler hole situated at the top of the termination 4. In this application, the resin 5 is used to prevent straightening of the tubes 2, i.e. to prevent radial displacement of the tubes 2 within the termination 4. Tensile loads are transmitted through the steel tubes 2 directly to the bulkhead plate 3 and thus to the termination 4, therefore the resin does not comprise a primary load bearing mechanism.

The welding process is very time consuming, costly and labour intensive and may harm polymer layers by heat from the welding, such as electrical cable sheathing and insulation material.

According to the present invention there is provided a termination assembly for a steel tube umbilical, wherein a plurality of the elongated umbilical elements which compose the umbilical are steel tubes, said termination assembly comprising a cavity through which said tubes pass, said cavity being filled with a filler material, at least one of said tubes having at least one region of increased localised diameter at a location within said cavity to define at least one load bearing face on the tube to anchor said at least one tube within said cavity.

Preferably said region of increased localised diameter is defined by a washer, sleeve or collar secured to said at least one tube at said at least one location.

Preferably said filler material comprises a hard setting compound such as, for example, an epoxy, polyester, vinylester or phenolic curable resin.

Preferably said region of increased localised diameter is defined by a collar located around said at least one tube and having an inner diameter substantially equal to the outer diameter of said at least one tube. Preferably said collar is formed from a metal compatible to the tube metal and is welded to said at least one tube. Preferably said collar is welded to said tube on one side of the collar only (although welding both sides is acceptable), preferably on the side of the collar furthest from the load bearing face of the collar such that the weld is in compression.

Preferably the collar is modified to present one or more further load bearing faces, for example by means of one or more regions of reduced diameter.

Preferably each of said steel tubes includes at least one region of increased localised diameter.

According to a further aspect of the present invention there is provided a method of forming a termination assembly for a steel tube umbilical wherein a plurality of the elongated umbilical elements which compose the umbilical are steel tubes, comprising the steps of passing said steel tubes through a cavity within said termination assembly, forming at least one region of increased localised diameter on at least one of said steel tubes at a location within said cavity to define at least one load bearing face on the tube, filling the cavity with a filler material to anchor said at least one tube within said cavity by means of said at least one region of increased localised diameter.

Preferably the step of forming at least one region of increased localised diameter on at least one of said steel tubes comprises securing a washer, sleeve or collar to said at least one tube at said at least one location.

In one embodiment, the step of forming at least one region of increased localised diameter on at least one of said steel tubes may comprise welding a collar around said at least one tube at said at least one region.

Preferably the method includes the step of welding the collar to said tube on one side of the collar only, preferably on the side of the collar furthest from the load bearing face of the collar.

The method may comprise the further step of modifying the collar to present a plurality of load bearing faces, preferably by forming one or more regions of reduced diameter on the collar to define one or more further load bearing surfaces.

Preferably the method comprises the step of forming at least one region of increased localised diameter on each of said steel tubes.

Preferred embodiments of the present invention will now be described by way of example only, with reference to the accompanying drawings, in which:

DESCRIPTION OF PREFERRED EMBODIMENTS

Figure 1:
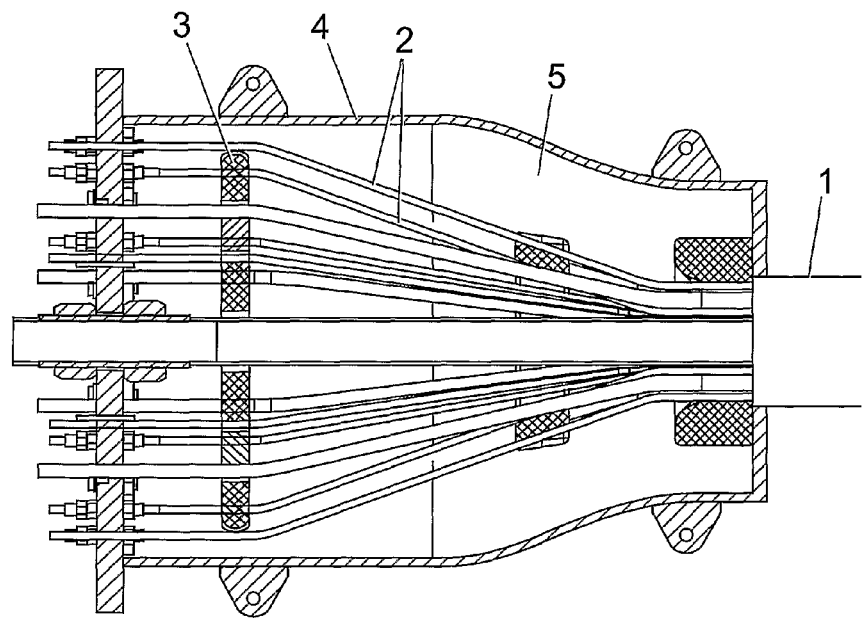
FIG. 1 is a longitudinal sectional view through a known umbilical termination assembly.
Figure 2:
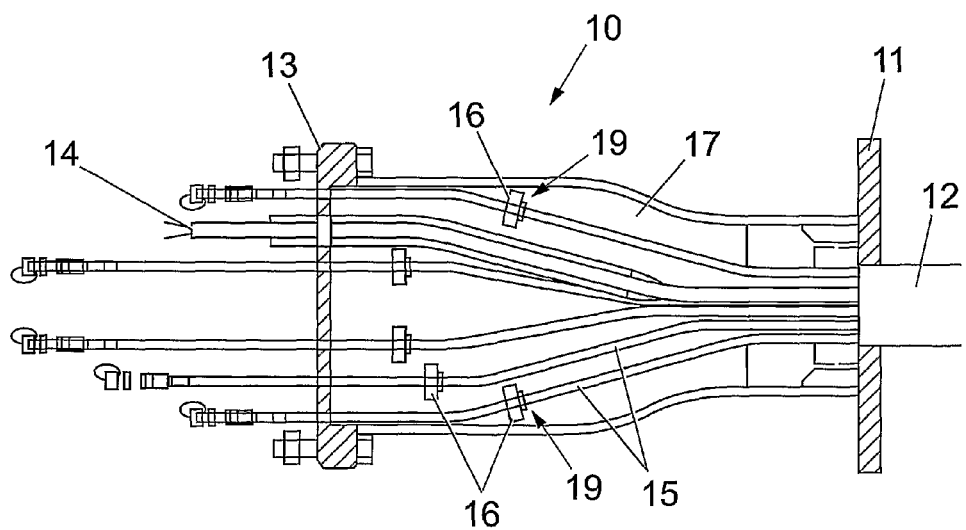
FIG. 2 is a longitudinal sectional view through an umbilical termination assembly according to an embodiment of the present invention.

As illustrated in FIG. 2, the umbilical termination assembly comprises a termination head 10 having a first plate 11 having an aperture through which the umbilical 12 enters and a second plate 13 having a plurality of apertures therein through which the various umbilical elements, including electrical cables and/or optical fibre cables 14 and steel tubes 15, can pass for connection to hose fittings. A cavity 17 is defined between the first and second plates through which the umbilical elements pass.

Each steel tube 15 of the umbilical 12 has a compression collar 16 located thereon and welded thereto to define a load bearing face 19 to anchor the umbilical into the termination 10 as will be described below. The cavity 17 of the termination 10 is filled with a compression resistant filler material, to fix the umbilical elements in place within the termination and to anchor the load bearing steel tubes 15 within the termination 10 to withstand tensile forces applied to the umbilical 12 and to anchor the umbilical 12 into the termination 10.

The compression collars 16 require a compression resistant filler material through which any tensile loads applied to the tubes, can be transmitted to the termination 10. The compression resistant filler material is preferably a hard setting compound comprising a curable resin. Suitable resin materials, such as epoxy, comprise a base resin, an accelerator and/or hardener and preferably a filler medium suspended interstitially within the resin. The solid filler medium is used primarily as the compression resistant medium, held in suspension within the resin compound. In addition, extra filler medium can be added to increase the viscosity of the mixed compound and reduce exothermic temperatures.

In a preferred embodiment, the filler material comprises spheroidal glass beads. In the present application, "spheroidal beads" should be understood as bodies having a substantially spherical shape, that may or may not be perfectly round or spherical, that may or may not have uniform sizes and shapes, and that may be solid or hollow. Resin can be mixed with the spheroidal glass beads with or without small grain interstitial filler medium and gravity poured into the termination or, alternatively, resin can be injected into the termination to fill the interstitial spaces, created between the dry spheroidal glass beads which have been previously introduced into the termination. Optionally an interstitial filler medium, such as sand or spheroidal glass micro-beads, is also provided. In the present application, "spheroidal micro-beads" should be understood as bodies having a similar shape as the spheroidal beads, but with much smaller dimensions. The relative small size of the spheroidal micro-beads enables them to fill the interstices between the spheroidal beads.

Figure 3:
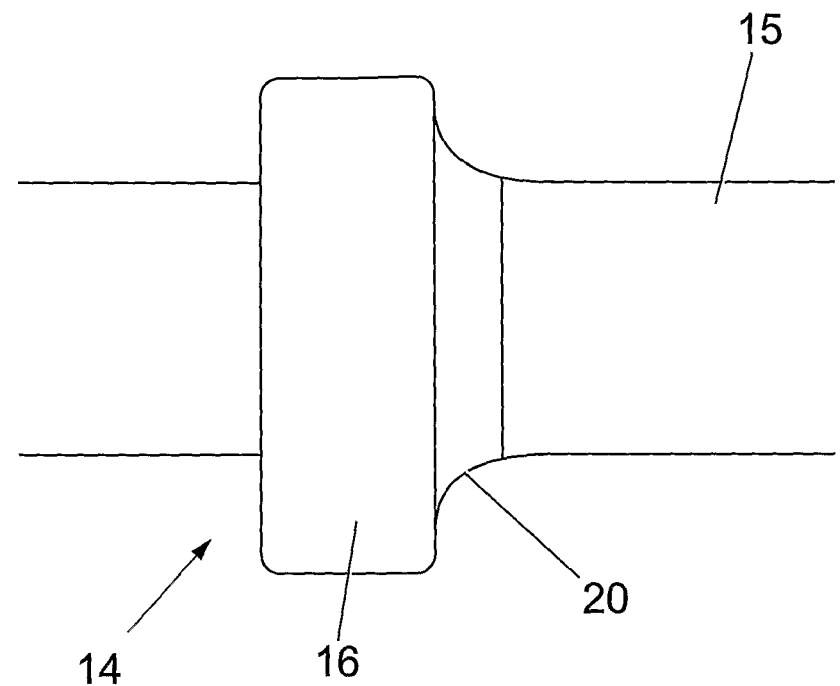
FIG. 3 is a perspective view of a compression collar welded to a steel tube of the umbilical termination assembly of FIG. 2.

The termination assembly is assembled by sliding a compression collar 16 over each steel tube 15 and welding the collar in place, generally, as shown in FIG. 3. Once assembled, the termination cavity 17 may be filled, under gravity, with the hard setting compound, through the filler hole situated at the top of the termination 10. Alternatively, the resin compound may be injected into the cavity under pressure through one or more inlets.

Attaching the compression collar 16 using two welds has been proved un-necessary, as one weld 20 on the non-compression end of the collar 16 (as shown in FIG. 3) has proven superior. The method of welding the compression collar at both ends can promote failure in the weld under tension on the compression face. In tests, single welded samples (weld in compression) failed in the tube itself, away from the weld. A single weld also reduces welding and Non Destructive Testing costs by nominally 50%.

To demonstrate the suitability for application of a compression collar 16 welded only on the non-compression face, a full size termination was assembled with five tubes; each tube fitted with a single collar. The termination was then filled using a resin based filler material. This sample was axially loaded until failure of the tubes. Upon strip down of the sample, it was observed, that all tubes failed away from the collar, substantiating the suitability of the single welded compression collar.

Figure 4:
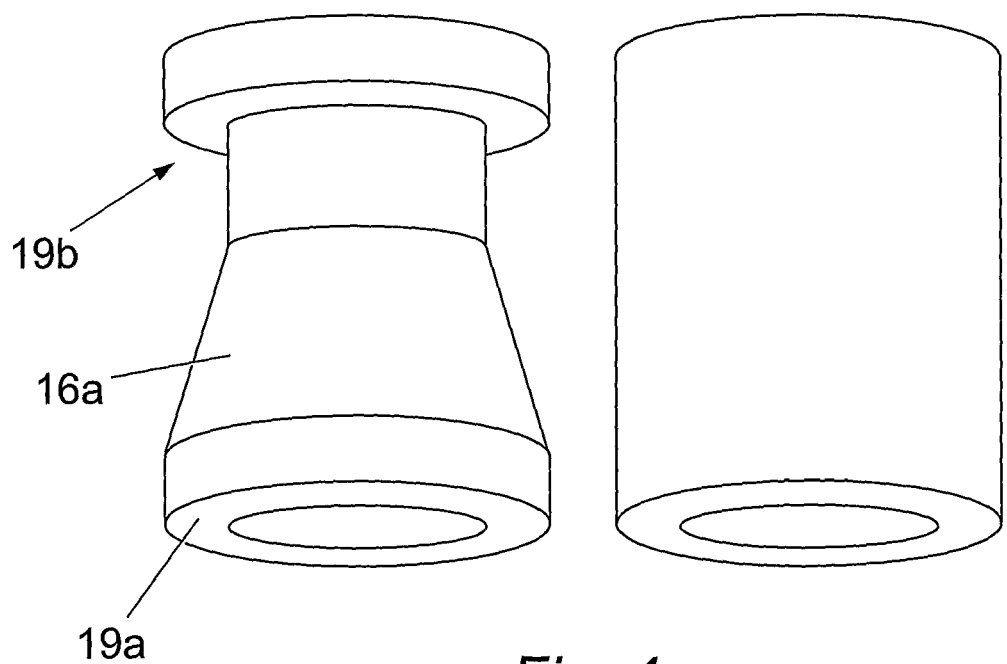
FIG. 4 is a perspective view of a compression collar according to a further embodiment of the invention.

FIG. 4, shows how a standard collar, (shown on the right) can be altered to affect a greater loading area (shown on the left). The improved compression collar 16a has been machined to form two axially spaced load bearing faces 19a, 19b. This is of particular benefit when designing collars for use in slender terminations where radial space is limited.

Figure 5:
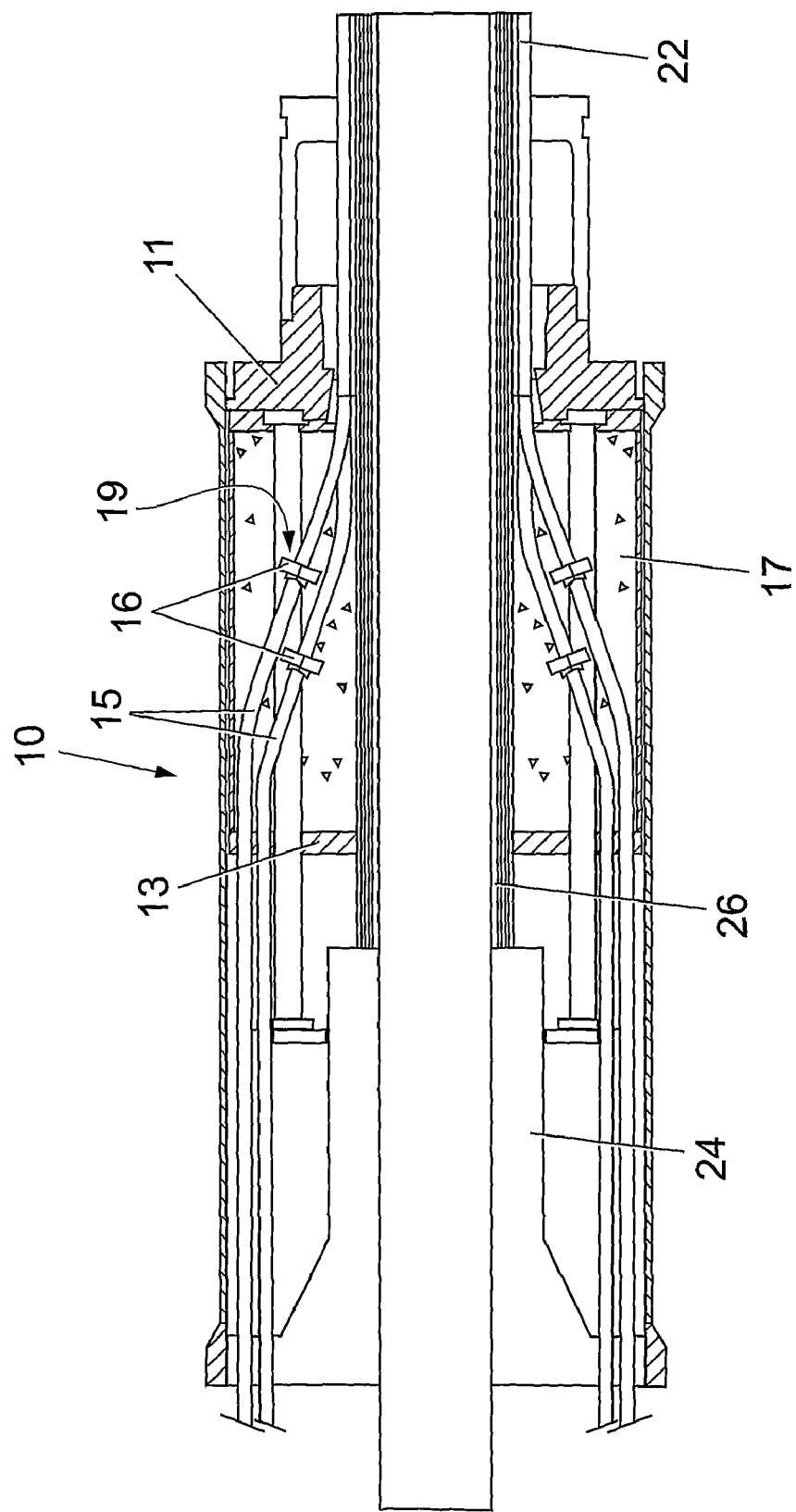
FIG. 5 is a longitudinal sectional view through an Integrated Production Bundle (IPB) termination assembly according to a further embodiment of the present invention.

FIG. 5 shows an embodiment of the invention used for anchoring the peripheral steel tubes 15 of an Integrated Production Bundle (IPB) 22 to a termination 10. The IPB termination assembly comprises a first plate 11 having an aperture through which the IPB 22 enters and a second plate 13 having a plurality of apertures therein through the central flexible pipe 26 and the various IPB peripheral elements, including electrical cables and/or optical fibre cables and steel tubes 15, can pass for connection to hose fittings. The central flexible pipe is connected to a central end-fitting 24 according to well known prior art. An annular cavity 17 is defined between the first and second plates and around the central flexible pipe 26. The IPB peripheral elements, including the steel tubes 15, pass through the annular cavity 17. Each peripheral steel tube 15 of the IPB 22 has a compression collar 16 located thereon and welded thereto to define a load bearing face 19 to anchor each steel tube 15 into the termination 10. The annular cavity 17 of the termination 10 is filled with a compression resistant filler material, to anchor the peripheral steel tubes 15 within the IBP termination 10.

A variation of this invention could be used for anchoring the load carrying steel rods of the umbilicals similar to those disclosed in U.S. Pat. No. 6,472,614. In this variation, each steel rod has a compression collar located thereon and welded thereto to define a load bearing face to anchor each steel rod into the termination cavity filled with a compression resistant hard setting compound.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. A termination assembly for a steel tube umbilical for a subsea installation, the umbilical including a plurality of elongated umbilical elements comprising steel tubes, said termination assembly comprising;
    a cavity configured to receive said steel tubes, said cavity being filled with a filler material,
    wherein at least one of said steel tubes has at least one region of increased localised diameter at a location within said cavity;
    said at least one region defining at least one load bearing face on the at least one steel tube, said at least one region configured to anchor said at least one steel tube within said cavity;
    wherein said region of increased localised diameter is defined by a collar having an inner diameter substantially equal to the outer diameter of said at least one steel tube;
    wherein said collar is formed from a material compatible with the steel tube metal and is welded to said at least one steel tube.

2. A termination assembly as claimed in claim 1, wherein said filler material comprises a hard setting compound.

3. A termination assembly as claimed in claim 1, wherein said collar is welded to said tube on one side of the collar only.

4. A termination assembly as claimed in claim 3, wherein said collar is welded to said tube on the side of the collar furthest from the load bearing face of the collar.

5. A termination assembly as claimed in claim 1, wherein the collar is modified to present a plurality of load bearing faces.

6. A termination assembly as claimed in claim 5, wherein one or more regions of reduced diameter are formed on the collar to define one or more further load bearing surfaces.

7. A termination assembly as claimed in claim 1, wherein each of said steel tubes includes at least one region of increased localised diameter.

8. A method of forming a termination assembly for a steel tube umbilical for a subsea installation, wherein a plurality of elongated umbilical elements which compose the umbilical are steel tubes, the method comprising the steps of:
    passing said steel tubes through a cavity within said termination assembly;
    forming at least one region of increased localised diameter on at least one of said steel tubes at a location within said cavity to define at least one load bearing face on the tube;
    filling the cavity with a filler material to anchor said at least one tube within said cavity by means of said at least one region of increased localised diameter,
    wherein the step of forming at least one region of increased localised diameter on at least one of said steel tubes comprises welding a collar around said at least one tube at said at least one region.

9. A method as claimed in claim 8, comprising the step of welding the collar to said tube only on the side of the collar furthest from the load bearing face of the collar.

10. A method as claimed in claim 8, comprising the further step of modifying the collar to present a plurality of load bearing faces.

11. A method as claimed in claim 10, wherein the step of modifying the collar comprises forming one or more regions of reduced diameter on the collar to define one or more further load bearing surfaces.

12. A method as claimed in claim 8, comprising the step of forming at least one region of increased localised diameter on each of said steel tubes.

13. A method as claimed in claim 8, wherein the step of welding comprises welding the collar to said tube on one side of the collar only.

* * * * *

UNITED STATES PATENT AND TRADEMARK OFFICE
CERTIFICATE OF CORRECTION

PATENT NO. : 8,408,311 B2
APPLICATION NO. : 12/443008
DATED : April 2, 2013
INVENTOR(S) : Daniel Grayson, Christopher Jameson and Anthony Hanson Page 1 of 1

It is certified that error appears in the above-identified patent and that said Letters Patent is hereby corrected as shown below:

Title Page, Item (75) Inventors: should read

(75) Inventors: Daniel Grayson, Hartlepool (GB);
Christopher Jameson, Newcastle Upon Tyne (GB);
Anthony Hanson, Tyne and Wear (GB)

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,408,311 B2  
APPLICATION NO. : 12/443008  
DATED : April 2, 2013  
INVENTOR(S) : Grayson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this
First Day of September, 2015

Michelle K. Lee
*Director of the United States Patent and Trademark Office*